US010673363B2

(12) United States Patent
Hirzinger-Unterrainer et al.

(10) Patent No.: US 10,673,363 B2
(45) Date of Patent: Jun. 2, 2020

(54) REGULATING METHODS FOR OPERATING AN INTERNAL COMBUSTION ENGINE UPON NETWORK FAULT DETECTION

(71) Applicant: INNIO Jenbacher GmbH & Co OG, Jenbach (AT)

(72) Inventors: Johann Hirzinger-Unterrainer, Koessen (AT); Uwe Liebscher, Kufstein (AT); Herbert Schaumberger, Muenster (AT); Josef Thalhauser, Nussdorf (AT)

(73) Assignee: GE Jenbacher GmbH CO OG, Jenbach (AT)

( * ) Notice: Subject to any disclaimer, the term of this patent is extended or adjusted under 35 U.S.C. 154(b) by 45 days.

(21) Appl. No.: 14/872,354

(22) Filed: Oct. 1, 2015

(65) Prior Publication Data

US 2016/0126874 A1    May 5, 2016

(30) Foreign Application Priority Data

Oct. 30, 2014   (AT) .................................. A 796/2014

(51) Int. Cl.
  *H02P 9/10*   (2006.01)
  *H02P 9/04*   (2006.01)
  (Continued)

(52) U.S. Cl.
  CPC ............... *H02P 9/04* (2013.01); *F02B 63/04* (2013.01); *F02D 19/023* (2013.01); *F02D 29/06* (2013.01);
  (Continued)

(58) Field of Classification Search
  CPC ........ F02B 63/04; F02D 19/023; F02D 29/06; F02D 41/0027; F02D 41/021; H02P 9/04; Y02T 10/32
  See application file for complete search history.

(56) References Cited

U.S. PATENT DOCUMENTS 4,989,573 A * 2/1991 Yokoyama .............. F02B 43/00
                                                 123/179.21
9,382,855 B2 * 7/2016 Fahringer ............... F02D 17/00
  (Continued)

FOREIGN PATENT DOCUMENTS

AT         413 132        11/2005
AT         509 558         9/2012
  (Continued)

OTHER PUBLICATIONS

Austrian Search Report issued Mar. 5, 2015 in corresponding Austrian Patent Application No. 796/2014 (with English translation).

(Continued)

*Primary Examiner* — Abdullah Riyami
*Assistant Examiner* — S. Mikailoff
(74) *Attorney, Agent, or Firm* — GE Global Patent Operation; Rita D. Vacca

(57) ABSTRACT

A method of operating an internal combustion engine, wherein a fuel-air mixture is burnt in the internal combustion engine and the internal combustion engine drives a generator, wherein the generator is connected to a power supply network and delivers power to the power supply network and wherein upon or after detection of a dynamic network fault by which the power delivery of the generator into the power supply network is reduced acceleration of the internal combustion engine is prevented or limited, wherein upon or after the detection of the network fault in the power supply network the fuel feed to the internal combustion engine is increased.

6 Claims, 2 Drawing Sheets

Figure 1:
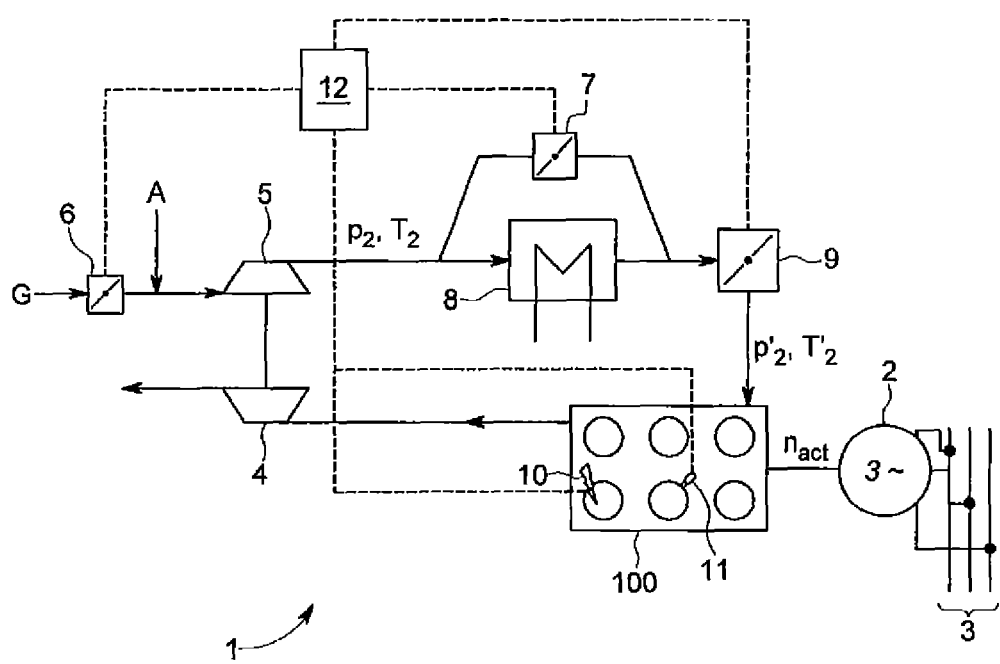

(51) Int. Cl.
*F02D 41/02* (2006.01)
*F02D 19/02* (2006.01)
*F02D 29/06* (2006.01)
*F02D 41/00* (2006.01)
*F02B 63/04* (2006.01)

(52) U.S. Cl.
CPC ....... *F02D 41/0027* (2013.01); *F02D 41/021* (2013.01); *Y02T 10/32* (2013.01)

(56) References Cited

U.S. PATENT DOCUMENTS

| | | | |
|---|---|---|---|
| 9,733,313 B2* | 8/2017 | Gomez | H02P 9/10 |
| 9,926,862 B2* | 3/2018 | Gomez | F02D 41/021 |
| 2003/0024503 A1 | 2/2003 | Fahringer et al. | |
| 2009/0058086 A1 | 3/2009 | Arinaga et al. | |
| 2009/0250943 A1 | 10/2009 | Larsen | |
| 2009/0261599 A1* | 10/2009 | Alston | B60L 15/2045 290/40 B |
| 2009/0287392 A1* | 11/2009 | Thomas | F02D 41/0027 701/103 |
| 2011/0180043 A1 | 7/2011 | Falkowski et al. | |
| 2012/0175876 A1* | 7/2012 | Pendray | F02D 19/02 290/41 |
| 2012/0292921 A1* | 11/2012 | Fahringer | F02D 17/00 290/40 B |
| 2014/0015257 A1 | 1/2014 | Dobbs | |
| 2015/0109021 A1* | 4/2015 | Gomez | G01R 31/40 324/764.01 |
| 2015/0115616 A1* | 4/2015 | Gomez | F02D 41/021 290/40 B |
| 2015/0115997 A1* | 4/2015 | Gomez | H02P 9/10 324/764.01 |
| 2016/0126874 A1* | 5/2016 | Hirzinger-Unterrainer | F02D 41/0027 290/40 B |

FOREIGN PATENT DOCUMENTS

| | | |
|---|---|---|
| AT | 514 811 | 4/2015 |
| CN | 201181925 Y | 1/2009 |
| CN | 101946397 A | 1/2011 |
| EP | 2 433 355 | 3/2012 |
| EP | 2 868 903 | 5/2015 |
| JP | 2009-254232 A | 10/2009 |
| JP | 2014-159808 A | 9/2014 |
| WO | 2012/135258 | 10/2012 |

OTHER PUBLICATIONS

European Search Report issued Mar. 15, 2016 in corresponding European Application No. 15002782 (with English translation).
Unofficial English Translation of Japanese Office Action issued in connection with corresponding JP Application No. 2015-206182 dated Aug. 2, 2016.
Machine Translation of Chinese Office Action dated Sep. 21, 2017 for CN Patent Application No. 201510718131.8.
Decision of Refusal issued in connection with corresponding JP Application No. 2015-206182 dated Apr. 18, 2017.

* cited by examiner

REGULATING METHODS FOR OPERATING AN INTERNAL COMBUSTION ENGINE UPON NETWORK FAULT DETECTION

Stationary power plants comprising at least one internal combustion engine and at least one generator are frequently used in the mains network parallel mode of operation, feeding energy into a power supply network. In particular gas engines, that is to say internal combustion engines which are operated on the Otto cycle with gaseous fuel are suitable for such applications as they have a high degree of efficiency and a low level of polluting emissions.

In the mains network parallel mode of operation the power supply network presets the target voltage and the target frequency, as well as the phase of the AC voltage of the AC generator.

If a voltage drop or fluctuation occurs in the power supply network, that is to say a dynamic network fault, the rotary speed of the internal combustion engine and the AC generator connected thereto rises rapidly without suitable counteracting measures by virtue of the drop in the resistance by virtue of the power supply network.

The term dynamic network faults is used to denote voltage drops or fluctuations in the range of between a few 100 milliseconds (ms) and for example less than 700 ms, preferably 500 ms.

Voltage drops in the power supply network are referred to as "low voltage events".

In the case of applications in the mains network parallel mode of operation there are frequently defaults set for the feeding power plants with the aim of not further worsening the network fault.

The capability of a power supply unit during a dynamic network fault to appropriately react, that is to say to remain connected to the network without adversely influencing the network, is referred to as "fault ride through" (FRT) or—in relation to voltage drops—as "low-voltage-ride through" (LVRT).

Some regulating methods are known from the state of the art, which aim to prevent a rise in the rotary speed of the internal combustion engine (acceleration) in the case of a drop in load.

Thus AT 413 132 B describes a closed-loop regulating device which for load shedding sets the throttle valve to a permissible minimum position differing from the completely closed position and shuts down at least one cylinder to prevent over-revving.

AT 509 558 B1 describes a method in which, when the actual speed of the AC generator or the internal combustion engine is exceeded above a predeterminable maximum value due to a failure in respect of the power supply network the combustion in the internal combustion engine is at least temporarily stopped while the connection to the power supply network is maintained. With that method the closed-loop control device reduces the fuel feed to the internal combustion engine above a predeterminable limit value for the rotary speed and/or stops at least one ignition device while the connection between the AC generator and the power supply network remains maintained.

EP 2 433 355 B1 discloses a method in which, in response to abrupt changes in the electric load, that feed of fuel to the internal combustion engine which existed prior to detection of the voltage drop is maintained while at the same time the ignition of the internal combustion engine is modified in order to reduce the power output from the internal combustion engine and/or the exciter field of the generator is increased to increase the moment to the generator in order thus to maintain the resistance to the internal combustion engine and the generator in equilibrium.

US 20110180043 A1 shows an internal combustion engine for electricity generation (genset) with electronic fuel injection, wherein at load changes ignition timing and fuel injection can be changed in dependence of electrical values and crank shaft position.

The regulating concepts shown in the state of the art therefore provide for a fuel reduction or at most maintenance of a fuel feed as it existed prior to the occurrence of the network fault, with at the same time a change in ignition in order to reduce the power output from the internal combustion engine during the voltage drop in the network. Both measures cause a drop in the drive power of the internal combustion engine, which can result in massive problems with the default presettings of the network operator in the case of the network restoration, in particular in relation to a network fault of longer duration (from about 100 ms).

Austrian patent application A 832/2013 to the present applicant which is not directed to the same general kind of method and which is of earlier priority but is not a prior publication involves handling effects of the subtransient effects of a short-circuit process, that occur in a very short period of time of some few multiples of 10 milliseconds after a network fault.

The object of the invention is to provide a method, an internal combustion engine and a genset which do not have those disadvantages.

The fact that, upon or after the detection of the network fault in the network the fuel feed to the internal combustion engine is increased provides that the internal combustion engine returns as quickly as possible to its nominal load again even after a longer-lasting network fault after the voltage drop disappears.

An application of the invention is lean-burn engines (operation at lambda>1) as this affords a possibility of enrichment and/or increasing the charge pressure.

In the case of engines with stoichiometric combustion (operation with lambda=1) enrichment is not expedient, here the increase in fuel feed can be implemented by an increase in the charge pressure.

Unlike the above-discussed Austrian patent application A 832/2013 to the present applicant, which does not relate to the same general kind of method and which is of earlier priority but which is not a prior publication, the present application involves dealing with the consequences after the subtransient effects die away.

In the case of mixture-charged internal combustion engines it is advantageous to implement the increase in the fuel feed as early as possible, that is to say directly upon or after detection of the network fault leading to a reduced power delivery from the generator. For, here the length of the mixture path leads to a delay in transport of the mixture from the location of fuel metering (for example in a gas mixer) to a combustion chamber. Measures taken at the fuel metering system therefore take effect with a time delay in the combustion chamber. In the case of port injection machines, that is to say internal combustion engines in which fuel metering takes place directly upstream of a combustion chamber the intervention for increasing the fuel feed can take place later, in comparison with mixture-charged internal combustion engines.

Contrary to the general teaching and intuition therefore in the method according to the invention upon the detection of a network fault the fuel feed is not reduced or maintained but—on the contrary—increased. The term fuel feed is used to mean the feed of chemical energy in the form of hydrocarbons within a unit of time.

Preferably it is provided that the fuel feed to the internal combustion engine is increased at the same time or after deactivation or retardation of an ignition means.

Additionally or alternatively mechanical braking of the internal combustion engine can be provided by a mechanical brake.

Measures which prevent or limit acceleration of the internal combustion engine upon or after detection of a dynamic network fault are for example a mechanical brake, in addition measures which increase the braking moment of the generator like for example an increase in the exciter current at the generator, a reduction in the charge pressure, dissipation of power into ohmic resistances and so forth. In general terms these are measures which reduce the power output of the drive assembly.

It is preferably provided that the fuel feed to the internal combustion engine is increased by lowering the lambda value of the mixture fed to the internal combustion engine. If mixture formation occurs before passing into the engine (generally upstream of a turbocharger), that is to say the engine is a mixture-charged internal combustion engine, then the control intervention for increasing the fuel feed is effected by altering the gas amount target presetting for the gas metering valve in that direction that causes enrichment of the mixture, that is to say a reduction in lambda.

In a variant it is provided that the fuel feed to the internal combustion engine is increased by increasing the amount of gas for at least one port injection valve. If mixture formation is after the turbocharger as is the case for example for internal combustion engines with port injection, the control intervention for increasing the fuel feed is effected by increasing the gas amount target presetting for at least one port injection valve. In that case this is also referred to as air-charged engines.

Particularly in the case of a mixture-charged internal combustion engine, it may be particularly advantageous for the fuel feed to the internal combustion engine to be increased by increasing the charge pressure. The charge pressure can be increased for example by opening a throttle valve, increasing the effective compressor power (for example by closure of the compressor bypass or closure of a wastegate and so forth) or by altering turbocharger geometries when variable turbocharger geometries are available or combinations thereof.

That control intervention is preferably reverted again after or at the same time after ignition ON.

Protection is also claimed for an internal combustion engine wherein upon or after the detection of a network fault the open-loop and closed-loop control unit influences the fuel metering device so that the fuel feed to the internal combustion engine is increased. The limiting device for preventing or limiting acceleration of the internal combustion engine upon a dynamic network fault can be embodied for example by a function of the open-loop and closed-loop control unit by which the measures referred to hereinbefore are set, which prevent or limit acceleration of the internal combustion engine upon or after detection of a dynamic network fault.

Protection is also claimed for a genset comprising a generator and an internal combustion engine according to the invention. The term genset is the usual identification on the part of the man skilled in the art for the arrangement of a (stationary) internal combustion engine with a generator for generating power.

Preferably the invention is used in a power supply network in which the power fed into the power supply network by the internal combustion engine according to the invention is markedly lower (for example less than 10%, preferably less than 1%), than the total power of the power supply network.

The internal combustion engine can be a stationary engine, in particular a stationary gas engine.

Figure 2:
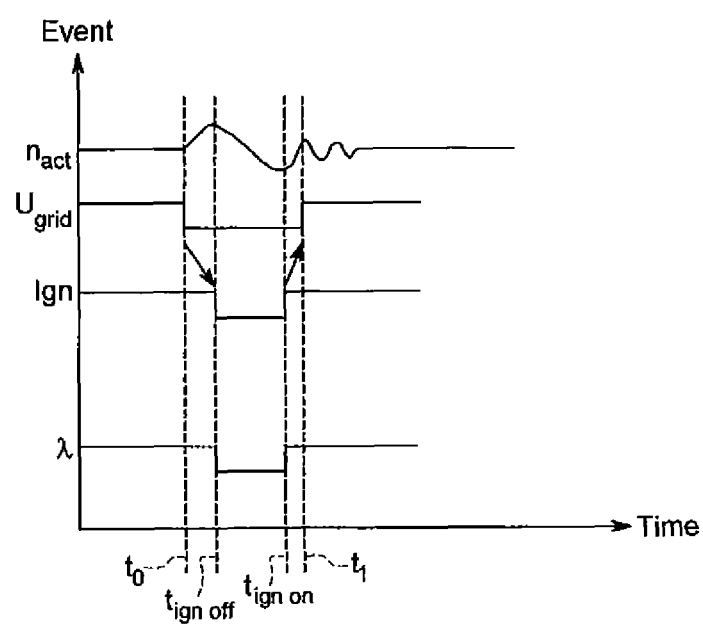

The invention will be described in greater detail hereinafter by reference to the Figures in which:

FIG. 1 is a diagrammatic view of an internal combustion engine with the accompanying control members, and FIG. 2 shows a schematic graph of the control interventions in relation to time.

FIG. 1 shows a diagrammatic view of an internal combustion engine 1 having an exhaust gas turbine 4, a compressor 5, a gas metering device 6, a compressor bypass valve 7, a mixture intercooler 8 and a throttle valve 9. The actual engine block of the internal combustion engine 1 is denoted by reference 100. Gas is fed to the gas metering device 6. The feed of air A is effected in this view downstream of the gas metering device 6. It is naturally also possible for gas G and air A to be fed in a common device, for example a venturi mixer.

The internal combustion engine 1 has an ignition means 10. Optionally it is possible to provide a port injection valve 11 through which fuel can be fed to the combustion chambers of the internal combustion engine 1 directly upstream of the inlet valves. The port injection valve 11 is only shown by way of example. In the configuration of FIG. 1 this involves a mixture-charged engine in which fuel metering is effected by way of the gas metering device 6 (for example a gas mixer).

The ignition means 10 and the port injection valve 11 are shown in simplified form only for one cylinder.

A generator 2 is connected to the internal combustion engine by way of a shaft. The generator 2 is shown here in the form of a 3-phase synchronous generator. The generator 2 feeds electric power into the power supply network 3. The rotary speed $n_{act}$ can be detected at the shaft between the internal combustion engine 1 and the generator 2, for example by way of a rotary speed measuring means. The corresponding sensor is not shown here.

An open-loop and closed-loop control unit 12 sends commands by way of signal lines to the control members gas metering device 6, a compressor bypass valve 7, a throttle valve 9, an ignition means 10, and a port injection valve 11. The open-loop and closed-loop control unit 12 also receives signals in respect of engine and/or generator parameters, for example the speed $n_{act}$.

The arrangement of an internal combustion engine 1 with generator 2 is referred to as the genset 13.

FIG. 2 shows a graph in respect of events and control interventions in relation to time.

The curve $n_{act}$ shows the variation in the rotary speed $n_{act}$ of the internal combustion engine before, during and after the network fault. It will be seen that the rotary speed firstly rises due to the reduction in power output by virtue of the network fault at the time $t_0$.

With a delay, the measure "ignition off" occurs at the time $t_{ign\ off}$ and the rotary speed falls. When a predeterminable minimum speed is reached the ignition means is re-activated. It is also possible to see post-oscillation effects after the network fault dies away.

The curve $U_{grid}$ shows the variation in the network voltage in relation to time. At the time $t_0$ a voltage drop in the network is to be observed, which persists to the time $t_1$.

The curve Ign diagrammatically shows the status of the spark ignition of the internal combustion engine. In that respect the high position of the curve denotes the ignition state in normal operation while the low position of the curve denotes deactivation of the ignition means. At the time $t_{ign\ off}$ the ignition means is deactivated as a reaction to the network fault, for example a voltage drop. At the time $t_{ign\ on}$ the ignition means is set back again to the ignition mode prevailing prior to the network fault.

The triggering aspect for resetting the ignition to the original ignition mode is for example the rotary speed signal, that is to say when a drop in the speed is observed the ignition means is re-activated or reset to the ignition mode prevailing prior to the network fault.

As an alternative to the rotary speed signal it is possible to use for example a rotor signal.

In the curve therebeneath the lambda value being the ratio of combustion air to fuel, is plotted in relation to time. The term combustion air ratio lambda is sufficiently well known. A lambda of 1 denotes the stoichiometric condition, that is to say there is precisely as much air available as is required for stoichiometric combustion of the fuel. A lambda of <1 denotes a sub-stoichiometric, that is to say rich, mode of operation while a lambda>1 denotes an over-stoichiometric, that is to say leaner, mode of operation. It will be seen from the illustrated variation in lambda that, after detection of the voltage drop at the time $t_{ign\ off}$ the lambda of the mixture fed to the internal combustion engine is reduced, that is to say the mixture is enriched. Before the network fault dies away the combustion air ratio lambda is restored to the value prevailing prior to the voltage drop. As explained for intervention in ignition the rotary speed signal can be used as a trigger for resetting to the initial value.

The particular advantage of the method according to the invention is that, after the voltage drop dies away, the internal combustion engine is restored to nominal load again substantially more quickly than is possible with the methods known from the state of the art.

By virtue of enrichment during the voltage drop a regulating reserve is so-to-speak implemented in the direction of higher loads. For short run-up times (referred to as ramp-up), meaning retrieval of the nominal load, maintenance of or even a reduction in the fuel feed during the voltage drop has proven to be disadvantageous.

For, when the regular network voltage is restored a high braking moment can be exerted by the generator on the internal combustion engine so that, even with the fuel feed being maintained, a drop in the speed of the internal combustion engine is to be observed when the network voltage is restored.

In contrast, with the method according to the invention and the apparatus according to the invention that overshoot can be compensated and the internal combustion engine presents a fast ramp-up without rotary speed reduction.

It is preferably provided that detection of the network fault is effected by observing the parameters voltage (of the generator), current (of the generator) and frequency (of the generator). Accordingly therefore there is no need to follow the generator power (active, reactive or apparent power)—for example at the connecting terminals—, but the far more sensitive indicators of voltage, current and frequency of the generator are used.

It should be added for explanation purposes that the voltage drops referred to in the context of this disclosure are typically of a duration of below 500 milliseconds (ms). The BDEW Transmission Code of 2007 (Network and System Rules of the German Transmission System Operators) provides for example that production plants may not disconnect from the network at voltage drops to 0% of the network voltage of a duration of less than/equal to 150 ms.

LIST OF REFERENCES USED 1 internal combustion engine
2 generator
3 power supply network
4 exhaust gas turbine
5 compressor
6 gas metering device
7 compressor bypass valve
8 mixture/charge air intercooler
9 throttle valve
10 ignition means
11 port injection valve
12 open-loop and closed-loop control unit
13 genset
100 engine block
$n_{act}$ rotary speed at the generator shaft
$p_2$ charge pressure upstream of the mixture/charge air intercooler
$T_2$ temperature upstream of the mixture/charge air intercooler
$P'_2$ charge pressure downstream of the mixture/charge air intercooler
$T'_2$ temperature downstream of the mixture cooler/charge air intercooler
A air
G gas

The invention claimed is:

1. A method of operating an internal combustion engine, the method comprising:
   connecting a generator to a power supply network;
   providing a fuel feed, at a prevailing fuel feed value, from an at least one fuel metering device to the internal combustion engine, the fuel feed comprising a fuel-air mixture;
   burning, via an ignition means, the fuel-air mixture in the internal combustion engine;
   driving the generator with the internal combustion engine to deliver electrical power to the power supply network;
   detecting a dynamic network fault, the dynamic network fault causing an increase in a rotary speed of the internal combustion engine or of the generator;
   upon or after detecting the dynamic network fault, deactivating the ignition means of the internal combustion engine, while at a same time as the deactivating, increasing the fuel feed from the at least one fuel metering device to the internal combustion engine;
   detecting the rotary speed of the internal combustion engine or of the generator;
   maintaining the increased fuel feed until the detected rotary speed decreases to a predeterminable minimum speed; and
   reactivating the ignition means when the predeterminable minimum speed has been reached so as to assist in restoring a network voltage of the power supply network.

2. A method as set forth in claim 1, wherein increasing the fuel feed from the at least one fuel metering device to the internal combustion engine occurs at a time $t_{ign\ off}$ and the increased fuel feed is maintained until a time $t_{ign\ on}$, at which time the fuel feed is restored to the prevailing fuel feed value being provided prior to the dynamic network fault.

3. A method as set forth in claim 1, wherein increasing the fuel feed to the internal combustion engine is achieved by a lowering of a lambda value of the fuel-air mixture burnt in the internal combustion engine.

4. A method as set forth in claim 1, wherein increasing the fuel feed to the internal combustion engine is achieved by increasing an amount of a gas supplied to at least one port injection valve.

5. A method as set forth in claim 1, wherein increasing the fuel feed to the internal combustion engine is achieved by increasing a charge pressure.

6. An internal combustion engine system comprising:
   an electrical generator connected to a power supply network;
   an internal combustion engine for driving the generator to deliver electrical power to the power supply network;
   at least one sensor for detecting a dynamic network fault of the power supply network, the dynamic network fault causing an increase in a rotary speed of the internal combustion engine or of the generator;
   a rotary speed sensor for detecting the rotary speed of the internal combustion engine or of the generator;
   a control unit for controlling the internal combustion engine;
   the internal combustion engine comprising:
     at least one fuel metering device for providing a fuel feed, at a prevailing fuel feed value, to the internal combustion engine, the fuel feed comprising a fuel-air mixture;
     at least one ignition means for burning the fuel-air mixture in the internal combustion engine;
   wherein the control unit is configured to perform the following steps:
     upon or after detection of the dynamic network fault, deactivating the ignition means of the internal combustion engine, while at a same time as the deactivating, increasing the fuel feed from the at least one fuel metering device to the internal combustion engine;
     receiving, from the rotary speed sensor, the detected rotary speed of the internal combustion engine or of the generator;
     maintaining the increased fuel feed until the detected rotary speed decreases to a predeterminable minimum speed; and
     reactivating the ignition means when the predeterminable minimum speed has been reached so as to assist in restoring a network voltage of the power supply network.

* * * * *